United States Patent [19]
Stewart

[11] 3,784,028
[45] Jan. 8, 1974

[54] GANTRY CRANE
[75] Inventor: Kenneth James Stewart, Muskegon, Mich.
[73] Assignee: Dresser Industries, Inc., Dallas, Tex.
[22] Filed: June 9, 1972
[21] Appl. No.: 261,470

[52] U.S. Cl. ...................... 212/11, 212/14, 105/163
[51] Int. Cl. ........................................... B66c 17/06
[58] Field of Search .................. 212/11, 13, 14, 16; 214/38 C, 38 CA, 38 CC; 105/368 B, 163; 104/48, 88

[56] References Cited
UNITED STATES PATENTS
| | | | |
|---|---|---|---|
| 3,645,406 | 2/1972 | Brazell | 212/14 |
| 1,429,012 | 9/1922 | Andrews | 187/95 |
| 3,483,829 | 12/1969 | Barry | 214/38 CA |

FOREIGN PATENTS OR APPLICATIONS
| | | | |
|---|---|---|---|
| 766,581 | 9/1967 | Canada | 212/14 |
| 404,102 | 11/1965 | Australia | 212/14 |

*Primary Examiner*—Allen N. Knowles
*Attorney*—Robert W. Mayer et al.

[57] ABSTRACT

A heavy duty gantry crane suitable for railroad piggy-back operations. Forming the bridge is a pair of spaced apart parallel girders supported on steel legs and wheeled trucks for operating over runway rails. Interconnecting trolleys laterally positionable on the bridge operate lift forks in controllably guided horizontal and vertical planes. A pendant push-button station connected to a widely pivotal swivel boom enables one man operational control from ground level.

10 Claims, 9 Drawing Figures

3,784,028
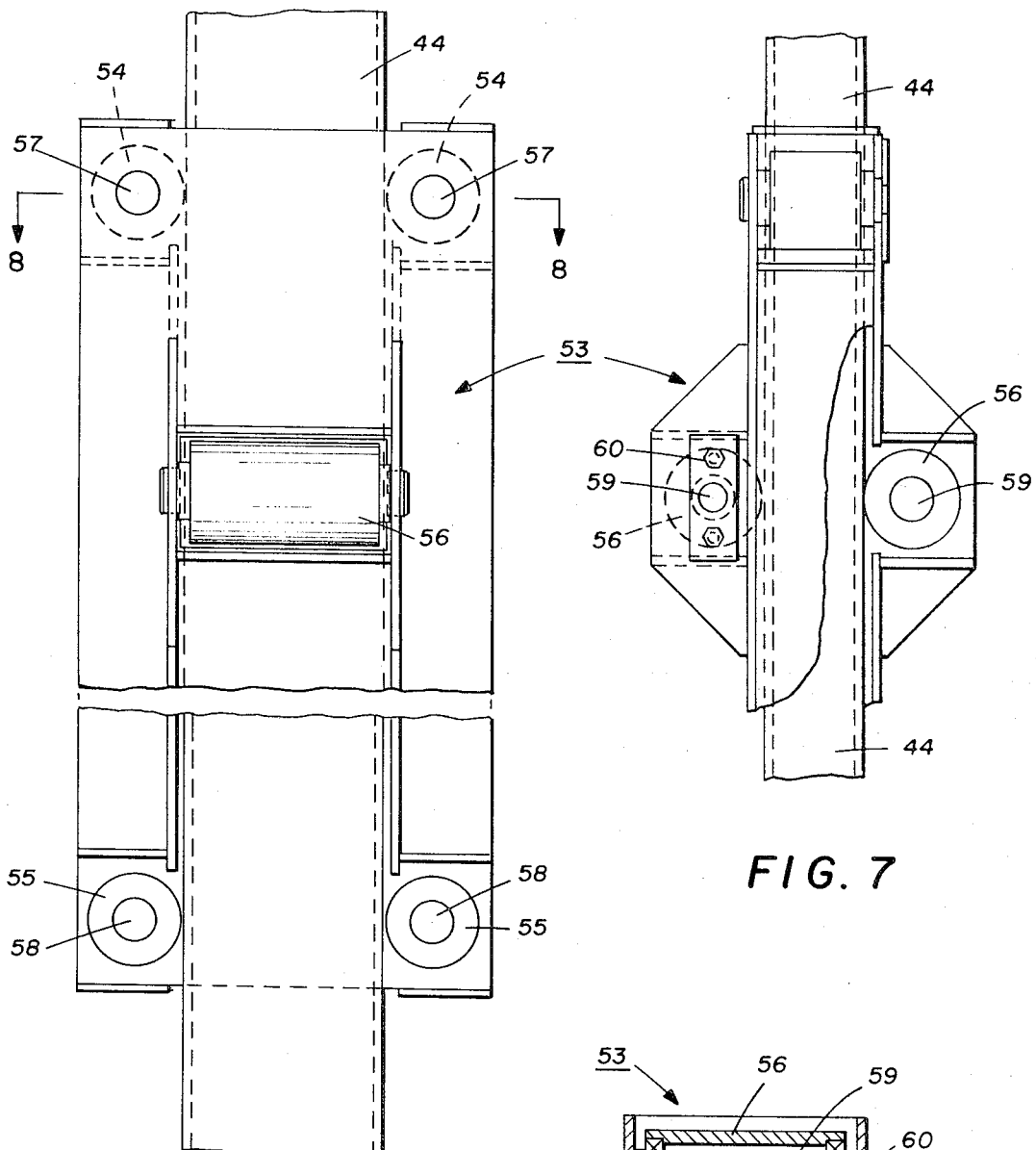
FIG. 7
FIG. 6
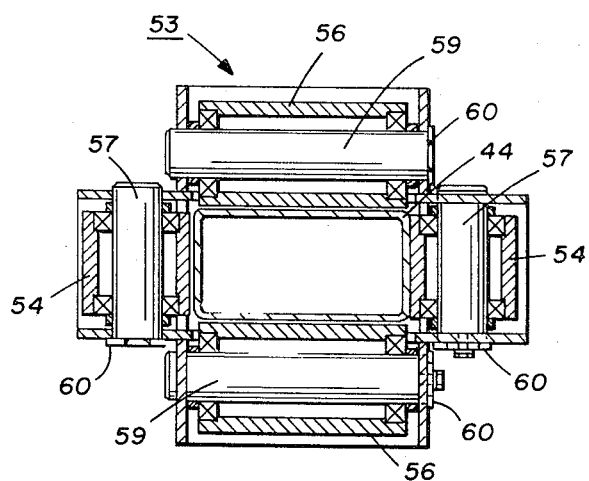
FIG. 8

GANTRY CRANE

BACKGROUND OF THE INVENTION

1. The field of art to which the invention pertains generally includes the art of traveling hoists as more specifically directed to load handling gantry type cranes.

2. Trailer-on-flat-car cargo handling, sometimes referred to in the trade as "piggyback," represents a major source of railroad revenue yet at the same time it imposes a relatively difficult handling problem with which the railroads have to contend. Individual loading and unloading in this type operation usually involves large elongated semi-trailers having loaded gross weights of on the order of 40 tons. Equipment for handling this magnitude of load to, for example, transfer it between tractor and flat car not only requires adequate load carrying capacity but also requires a maximum degree of load maneuverability to be afforded in and about the loading area. Moreover, and particularly in view of recent economic deterioration of the railroad industry, the capital cost and reliability of such handling equipment are becoming increasingly paramount considerations in dictating the purchased choice.

Most equipment employed for these purposes is typically of either the truck-driven side loader type or a form of overhead gantry crane. The former employs front end loading imposing practical load limitations on the device to avoid overturning while otherwise requiring vast areas of highly reinforced concrete foundation in and around the loading area for maneuverability. On the other hand, previously employed gantry cranes have usually been rubber tired, requiring heavily reinforced concrete ribbons while otherwise characterized as utilizing complex support and operating structures contributing to undesirably high capital cost and operating expense. Exemplifiying gantry cranes for piggyback handling are U.S. Pats. 3,081,884 and 3,645,406.

SUMMARY

The invention relates to gantry cranes and more specifically to gantry cranes particularly suitable for heavy duty service associated with railroad piggyback operations. In accordance herewith, maximum simplicity is afforded to both the support and operating structures whereby to enable capital and operating cost of such equipment to be substantially reduced as compared to existing gantries similarly employed. At the same time, this result is achieved with enhanced maneuvering flexibility accompanied by a generally greater handling reliability while eliminating the extensive and expensive reinforced concrete ribbons previously required.

These results are achieved by means of the invention utilizing a connected simple two girder bridge supported on steel legs for wheeled mobility over runway rails. Two trolleys operatively interconnected are supported on the bridge for companion concomitant operation of opposite lift frames in carefully guided horiozontal and vertical planes. In this manner, restrictively positive planar movement is afforded to the frames reinforced against sway that might otherwise be encountered. A pendant push-button station suspended from an overhead hinged swivel boom enables one man control of the entire crane assembly from ground level.

It is therefore an object of the invention to provide a novel form of gantry crane particularly suitable for railroad piggyback operations.

It is a further object of the invention to provide a novel gantry type crane as in the last mentioned object having maximum simplicity in support and operating structures for enabling ultimate cost reduction to the railroad consumer.

It is a further object of the invention to provide a piggyback service gantry crane having heavy duty capacity that affords enhanced maneuvering flexibility with a generally greater handling reliability as compared to such similar purpose structures of the prior art while decreasing rather than increasing the manufacturing complexities thereof.

BRIEF DESCRIPTION OF THE DRAWINGS

FIG. 6 is an enlarged front view of a lift fork vertical guide mechanism;

FIG. 7 is a partial sideview of the vertical guide;

FIG. 8 is a sectional view taken substantially along the lines of 8—8 of FIG. 6.

Figure 1:
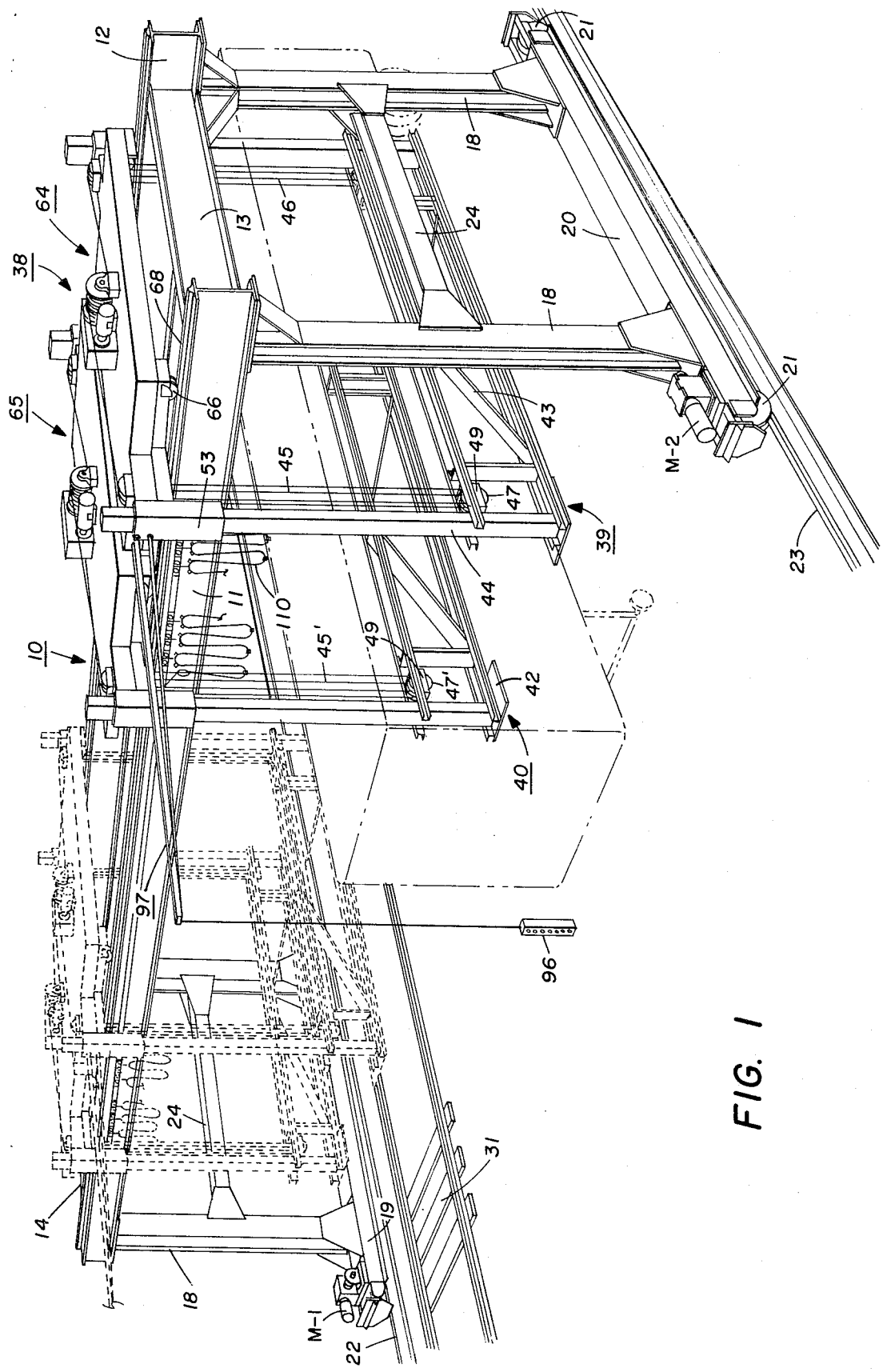
FIG. 1 is an isometric illustration of a double bay gantry crane construction in accordance herewith.
Figure 3:
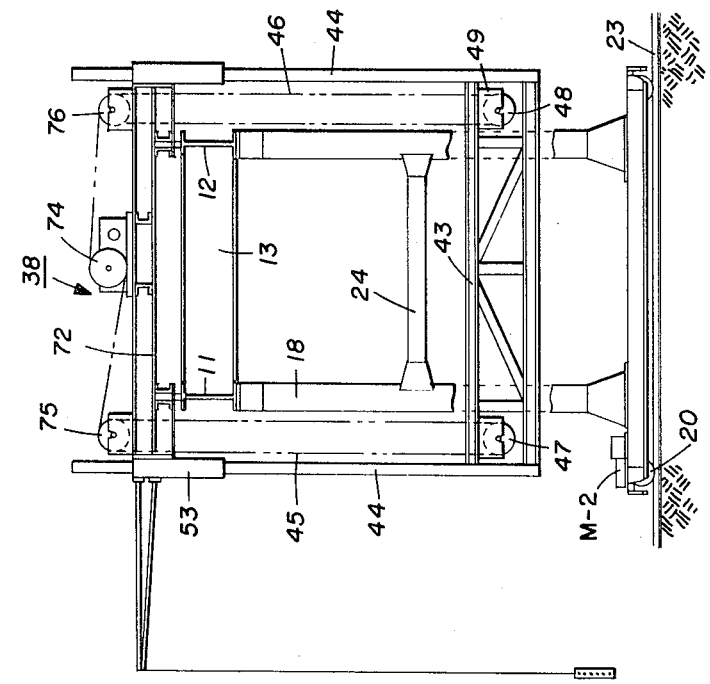
FIG. 3 is a side elevation of the crane.
Figure 2:
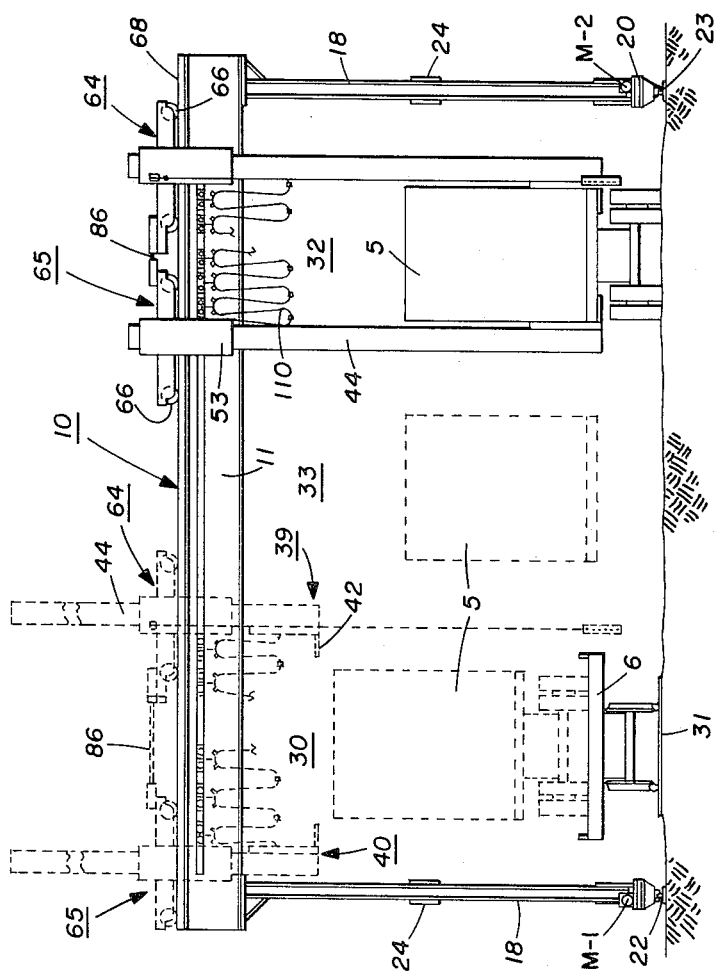
FIG. 2 is a front elevation of the crane.

Referring now to the drawings and most particularly to FIGS. 1–3, there is shown a gantry crane installation in accordance herewith for loading and unloading semi-trailers 5 from railroad flat cars 6. Comprising the crane is a rectangular shaped bridge, designated 10, formed of opposite girders 11 and 12 latticed together spanning the work area and joined at their ends by opposite intersecting girders 13 and 14. At each corner formed between the intersecting girders, the bridge is supported by a vertical column 18, opposite pairs of which rest on mobile trucks 19 and 20. Intermediate column stabilization in a longitudinal direction is provided by lateral beam 24. Each of the trucks includes a pair of tracking wheels 21 for engaging ground supported parallel track rails 22 and 23 over which the crane is driven by means of motors M1 and M2 for longitudinally positioning the crane as required. With the specific arrangement illustrated, the bridge spans a flat car loading and unloading bay 30 encompassing track 31 and tractor trailer receiving and discharge bays 32 and 33 respectively. The use of separate receiving and discharge bays in this manner for each rail car position affords minimal trailer handling while allowing for simultaneous loading and unloading of trailers. It is to be understood of course that the shown bay arrangement is intended only to be illustrative as exemplifying use of the invention but can readily be adapted otherwise in accordance with customer preference.

For loading and unloading semi-trailers between a tractor and flat car, a trolley assembly 38 for serving the various bays is provided with opposed inwardly facing lift frames 39 and 40. Each frame is comprised of a pair of spaced inwardly extending forks or lips 42 of relatively short longitudinal length that are laterally secured to joist-like bracing 43. The bracing in turn is supported at its end by depending rectangular guide tubes 44 vertically movable within vertical guide supports 53. Raising and lowering of the frames is coordinated in unison by means of hoisting assembly 38 that includes trolleys 64 and 65 for operating cables 45 and 46 extending vertically at opposite ends of each frame. The cables are reeved about sheaves 47 and 48 respectively supported in a frame 49 secured within bracing 43.

Each guide tube 44 is rigidly supported against other than vertical movement by a vertically elongated guide support 53 fixedly secured in matched pairs as by welding to one of hoist trolleys 64 and 65. Each of the guide supports 53, as can be best seen in FIGS. 6–8, is centrally hollowed to receive a guide tube 44 affording it freedom of movement in a carefully guided vertical relation. Effecting guidance in one direction are upper and lower oppositely positioned guide rollers 54 and 55 bearing against the tube sides in the course of its movement. Vertically intermediate the latter rollers are a pair of opposite guide rollers 56 likewise bearing against the other tube sides for effecting guidance in a transverse direction. The rollers themselves are bearing mounted about stationary pins 57, 58 and 59 respectively, that extend laterally through opposite sidewalls of their guide supports. In turn securing each pin in place thereat is a bolted mounting bracket 60. By means of the rollers engaging the guide tubes at displaced locations, accurate vertical alignment is readily maintained against tube sway from loading, wind or other sway inducing factors potentially encountered in operation of such devices.

Figure 5:
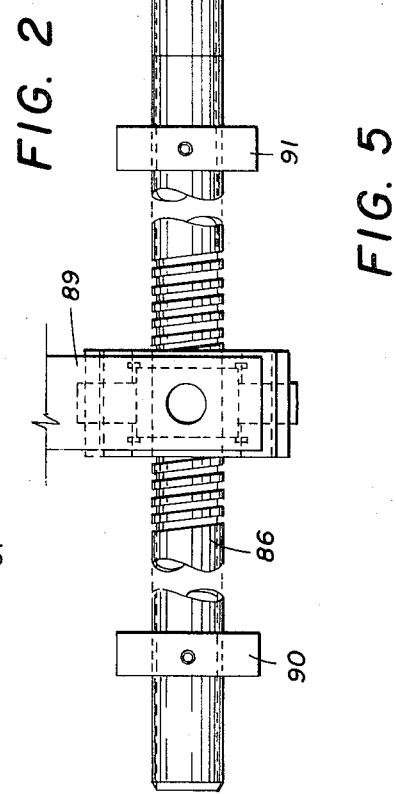
FIG. 5 is a partial enlarged plan view of the interconnecting trolley mechanism.
Figure 4:
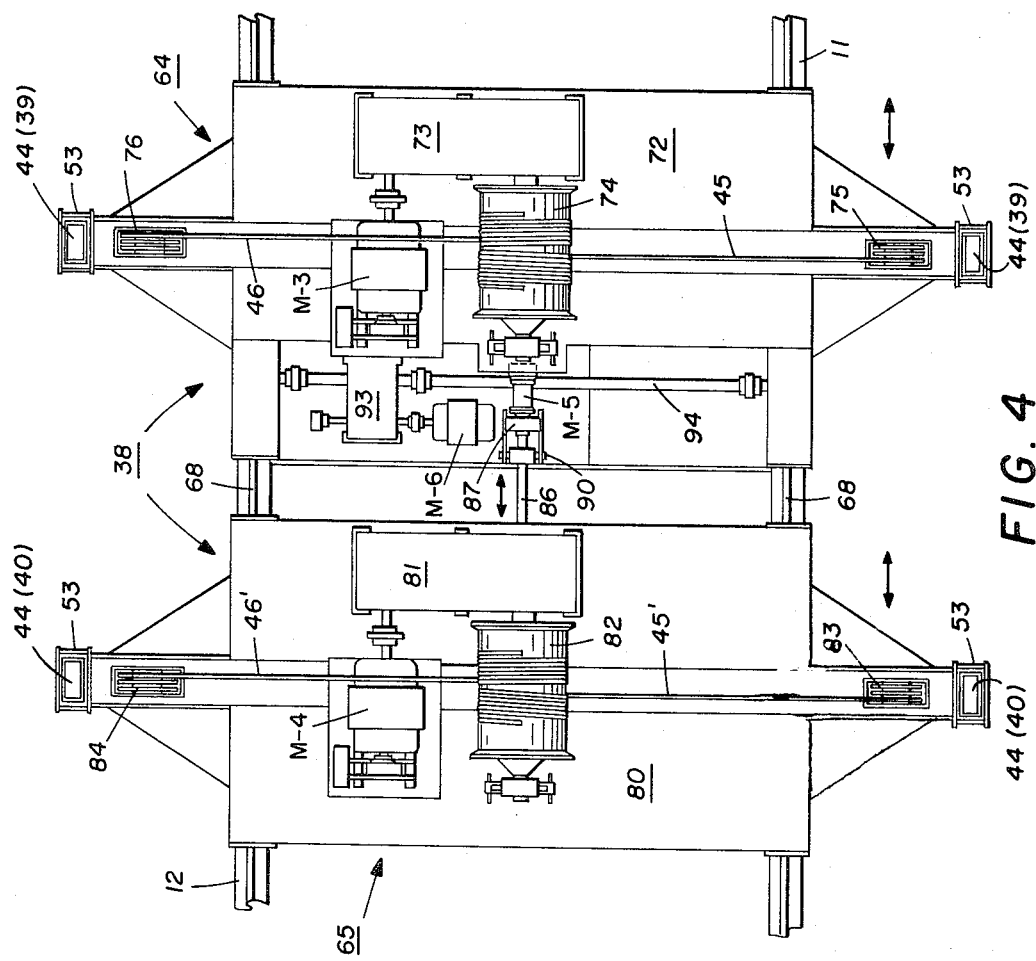
FIG. 4 is a top plan view of the hoisting apparatus.

Hoisting trolley assembly 38 will now be described with additional reference to FIGS. 4–5. Comprising the hoisting mechanism are the previously mentioned trolleys 64 and 65 representing "master" and "slave" trolleys respectively. Each trolley is supported on wheel sets 66 for riding on steel rails 68 secured along the top surface of girders 11 and 12. As will be understood, trolley operation is relatively coordinated for raising, lowering and horizontally setting the frame members during and subsequent to load handling of a semi-trailer between its tractor and flat car.

Master trolley 64, controlling frame member 39, comrises a structurally reinforced platform 72 on which the operating components are mounted and is itself supported via wheels 66 on trolley rails 68. Lowering and elevating of the frame is effected by motor M3 operating through a gear reducer 73 for driving rotatable cable drum 74. Cables 45 and 46 extend from attachment at one end of the drum reeved over multiple upper sheaves 75 and 76 and multiple lower sheaves 47 and 48 respectively. Turnbuckles, not shown, receive the rope ends and facilitate levelling of the frame.

Slave trolley 65 for controlling frame 40 and interconnected with trolley 64 likewise includes a structurally reinforced platform 80 supporting the operating components and is similarly supported via wheels 66 on trolley rails 68. Raising and lowering of frame 40 is effected by means of motor M4 operating through a gear reducer 81 for driving rotatable cable drum 82. Cables 45' and 46' are attached to the drum from where they extend and are reeved over multiple upper sheaves 83 and 84 and multiple lower sheaves 47' and 48' respectively similarly as described above for frame 39.

Movement of frames 39 and 40 horizontally as a unit and laterally on bridge 10 for either preliminary positioning or transporting a load is governed by motor M6 on master trolley 64 operating through a gear case 93 driving output shaft 94. The shaft in turn is connected to a wheel pair of set 66 such that when the motor is energized causes the trolleys to traverse over their supporting girders. To effect relative movement of frames 39 and 40 toward and away from each other for receiving or discharging a load, the trolleys are interconnected via a lead screw 86 operative by a torque and brake motor M5 through a gear reducer 87. A bearing assembly 88 on the lead screw is gimbal mounted to the master trolley whereas an Acme nut 89 on the lead screw is gimbal mounted to the slave trolley. Operation of motor M5 for rotating the lead screw causes movement of the slave trolley relatively toward and away from the master trolley. Adjustable stops 90 and 91 limit travel of the slave trolley to on the order of about 4 feet. By limiting the drive force of motor M5 to about 100 lbs., trailer oversqueezing or inadvertent opening of the frames when loaded are thereby prevented.

Figure 9:
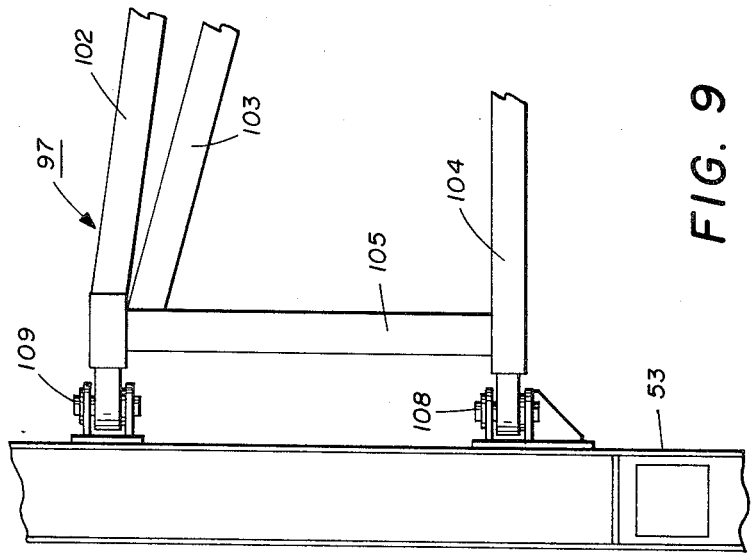
FIG. 9 is an enlarged fragmentary elevation of the swivel bottom support.

For operating the crane, there is provided a push-button station 96 suspended from a swivel boom 97 that is hingedly supported from the front face of a guide support 53 in the manner best illustrated in FIG. 9. As thereshown, boom 97 is formed of tubular components 102, 103 and 104 that merge toward the boom front and are joined at the rear by a vertical tube 105. The entire unit is supported on hinge pins 108 and 109 mounted onto the front face of the guide support. Push-button station 96 is suspended to within reasonable reach of an operator on the ground and by means of approximately 180° pivot travel afforded by the swivel boom, the operator has complete visible access to the frame positions for operating the various components as required. Circuiting employed is well known whereby power from a suitable source under control of the push-button station is transmitted to the various operating components via three wire festooned cable 110. Preferably, two speed hoisting is provided for faster movement when unloaded than when loaded.

By the above description there is disclosed a novel gantry crane apparatus suitable for heavy duty railroad piggyback operations. A relatively simple rectangular bridge construction of parallel girders supports the operating trolleys for transverse movement. The bridge itself is operative over runway rails for proper positioning relative to flat cars and semi-trailers received in their respective operating bays. Supported movement is restricted to the horizontal and vertical planes over which the lift frames are accurately guided to insure proper positioning and support of the semi-trailers to be handled thereby while minimizing or avoiding sway that might otherwise be encountered during the handling operation. By virtue of the near ground position of pendant control 96, the entire operation can be governed by a single operator at ground level able to visibly inspect all loading sides before hoisting is initiated. With this arrangement, maximum simplicity is afforded to both the crane support and its operating structure in order to obtain increasingly favorable manufacturing costs that can be passed on to the consumer. At the same time, the obtained cost reduction is achieved with enhanced maneuvering flexibility accompanied by a generally greater handling reliability while eliminating the expensive concrete support aprons previously required for similar purpose structures of the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which exclusive property or privilege is claimed are defined as follows;

1. A gantry crane adapted for semi-trailer piggyback railroad service comprising in combination:
   a. a bridge for spanning a semi-trailer piggy-back work area to be serviced;
   b. mobile bridge support means for locating the bridge longitudinally within the work area;
   c. a pair of oppositely extending lift frames individually supported from said bridge with each lift frame of said pair being positionable into and out of underlying support relation with a semi-trailer to be relocated within the work area;
   d. first drive means for presettable vertical positioning of said lift frames into and out of said support relation;
   e. second drive means for presettable horizontal positioning of said lift frames on said bridge relative to each other into and out of said support relation;
   f. third drive means for locating said positioned lift frames on said bridge transversely within the work area between said bridge support means for transporting a semi-trailer in support relation on said lift frames; and
   g. guide means effective for maintaining a substantially rigid transverse planar relation between the paths of vertical and horizontal movement incurred in the positioning of said lift frames by said first and second drive means.

2. A gantry crane according to claim 1 in which said first drive means includes first and second trolley means on said bridge each operative for vertically positioning one lift frame of said pair in coordinated relation to the other.

3. A gantry crane according to claim 2 in which said lift frames include horizontal lip members and non-circular vertical tubes connected to said lip members for effecting said underlying support relation and said guide means include vertically extending tube guides secured to said first and second trolley means to receive and vertically guide said tubes in the course of vertical lift frame positioning by said trolley means.

4. A gantry crane according to claim 3 in which said tubes are rectangular in cross-section and said tube guides include vertically displaced guide rollers in surface guiding engagement against opposite exterior surfaces of said tubes.

5. A gantry crane according to claim 3 in which said third drive means is operatively connected to said first and second trolley means for effecting trolley traversal of said bridge.

6. A gantry crane according to claim 3 in which said guide means includes horizontal guide rails on said bridge commonly supporting said first and second trolley means for horizontal positioning by said second drive means.

7. A gantry crane according to claim 6 including a lead screw interconnecting said first and second trolley means and operative by said second drive means.

8. A gantry crane according to claim 7 including pendant control means for selective operator actuation of said first, second and third drive means and a hinge connected swivel boom supporting said pendant control means for operator positioning within a predetermined arcuate range of operator viewing.

9. A gantry crane according to claim 8 in which said mobile bridge support means includes mobile trucks adapted for rail travel.

10. A gantry crane according to claim 2 in which said guide means includes horizontal guide rails on said bridge commonly supporting said first and second trolley means for horizontal positioning by said second drive means.

* * * * *